United States Patent
Ostwald et al.

(10) Patent No.: US 6,922,307 B2
(45) Date of Patent: Jul. 26, 2005

(54) DOUBLE DENSITY DATA STORAGE LIBRARY USING BACK TO BACK ARRAY WALLS

(75) Inventors: Timothy Craig Ostwald, Louisville, CO (US); Daniel J. Plutt, Superior, CO (US); Bernard Alan Johnson, Broomfield, CO (US); Donald Robert Manes, Arvada, CO (US); Roger Harry Grow, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 256 days.

(21) Appl. No.: 10/034,058

(22) Filed: Dec. 27, 2001

(65) Prior Publication Data

US 2003/0123184 A1 Jul. 3, 2003

(51) Int. Cl.⁷ .......................... G11B 15/68; G11B 17/22
(52) U.S. Cl. .................... 360/92; 369/30.45; 369/30.49
(58) Field of Search ............... 360/92; 369/30.01–39.01

(56) References Cited

U.S. PATENT DOCUMENTS

| | | | | |
|---|---|---|---|---|
| 3,646,258 A | * | 2/1972 | Lemelson | .................... 360/92 |
| 4,817,070 A | * | 3/1989 | Hug et al. | ................ 369/30.39 |
| 4,910,619 A | | 3/1990 | Suzuki et al. | .................. 360/92 |
| 4,945,429 A | * | 7/1990 | Munro et al. | .................. 360/92 |
| 5,892,750 A | | 4/1999 | Barkley et al. | |
| 6,166,877 A | * | 12/2000 | Tadokoro et al. | .............. 360/92 |
| 6,222,699 B1 | | 4/2001 | Luffel et al. | .................. 360/92 |
| 6,262,863 B1 | | 7/2001 | Ostwald et al. | ................ 360/92 |

FOREIGN PATENT DOCUMENTS

| | | |
|---|---|---|
| DE | 957200 C | 1/1957 |
| EP | 1107245 A1 | 6/2001 |
| GB | 1333745 A | 10/1973 |

* cited by examiner

*Primary Examiner*—Craig A. Renner
(74) *Attorney, Agent, or Firm*—Yee & Associates P.C.

(57) ABSTRACT

A data storage library having two inward facing storage arrays and two outward (i.e., back to back) facing arrays between the two inward facing arrays, such that an access device positioned to access one of the outward facing arrays can perform a rotation to be positioned to access one of the inward facing arrays. Thus a single access device can access all four arrays only by performing translations and rotations as necessary.

17 Claims, 8 Drawing Sheets

DOUBLE DENSITY DATA STORAGE LIBRARY USING BACK TO BACK ARRAY WALLS

FIELD OF THE INVENTION

The present invention is directed generally toward storage systems for handling data storage cartridges. More specifically, the present invention is directed to configuration and placement of storage arrays within a data storage library.

BACKGROUND OF THE INVENTION

Robotic media storage libraries, or data storage libraries, are devices for providing automated access to a large collection of data stored on multiple physical storage media, such as magnetic tape cartridges, disks, compact discs, or DVDs, for example. Data storage libraries generally contain a plurality of storage locations or slots for storing individual storage elements, one or more media drives for reading or writing physical media, and an access device or robotic "picker" for moving storage elements from a storage location to a drive and back. Robotic media storage libraries may have special storage locations designated for certain purposes, such as serving as a temporary storage location while two pieces of media are being swapped or for adding or removing physical media from the library.

Library storage density is limited to the actual volume of the device used to store the physical data cartridges or disks. In some cases this means limited floor space or area, or limited vertical shelf or wall space, depending on the particular configuration of the storage library.

In the typical library scheme, storage capacity is increased by increasing the size of the library itself. This requires increased floor space or increased wall space, depending on the type of library used. The area accessible to a retrieval device also limits the storage capacity of a library, because a retrieval device must have a path to reach each individual data storage element and, in most cases, the drives. Additionally, operator access to areas within large libraries for maintenance purposes also requires a certain amount of added room. These goals of decreased overall volume and increased accessible area conflict in storage library design, making storage density a key factor in the library marketplace.

There are several existing schemes for storage libraries. For example, libraries using concentric "silo" storage arrays, parallel linear wall arrays, and U-shaped arrays are known in the art. Of these examples, U-shaped typically provide the best storage density. Some previous designs are considered briefly below.

Figure 1:
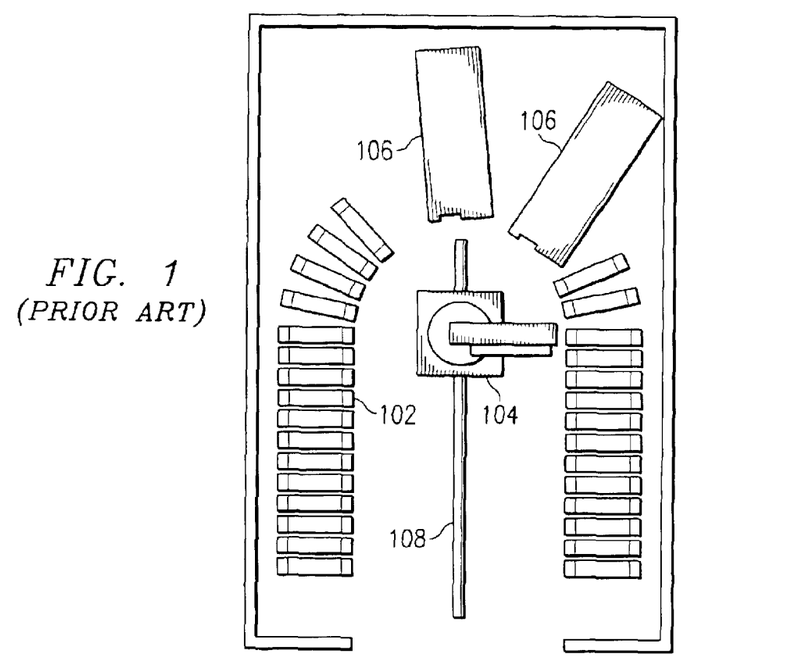
FIG. 1 shows an example of a previous data storage library.

FIG. 1 shows an example of a small, self-contained data storage library of a previous design. The library comprises an area surrounded by walls that enclose individual data storage elements 102, robotic access device 104, and tape drives 106 which read individual data storage elements 102. In this example, there are two parallel rows of storage slots for individual data storage elements. These rows of storage slots can be two dimensional arrays of storage slots, or stacked one dimensional arrays of storage slots. Between the two storage arrays is track 108 for access device 104, typically a robotic picker of some kind that can remove and replace data storage elements 102 from their slots and transport them to drives 106. Access device 104 is designed to have access to any slots in either array. This sample configuration also shows the storage sots extend beyond the parallel sections of the library to curve around toward the drives, adding capacity to the library.

Figure 2A:
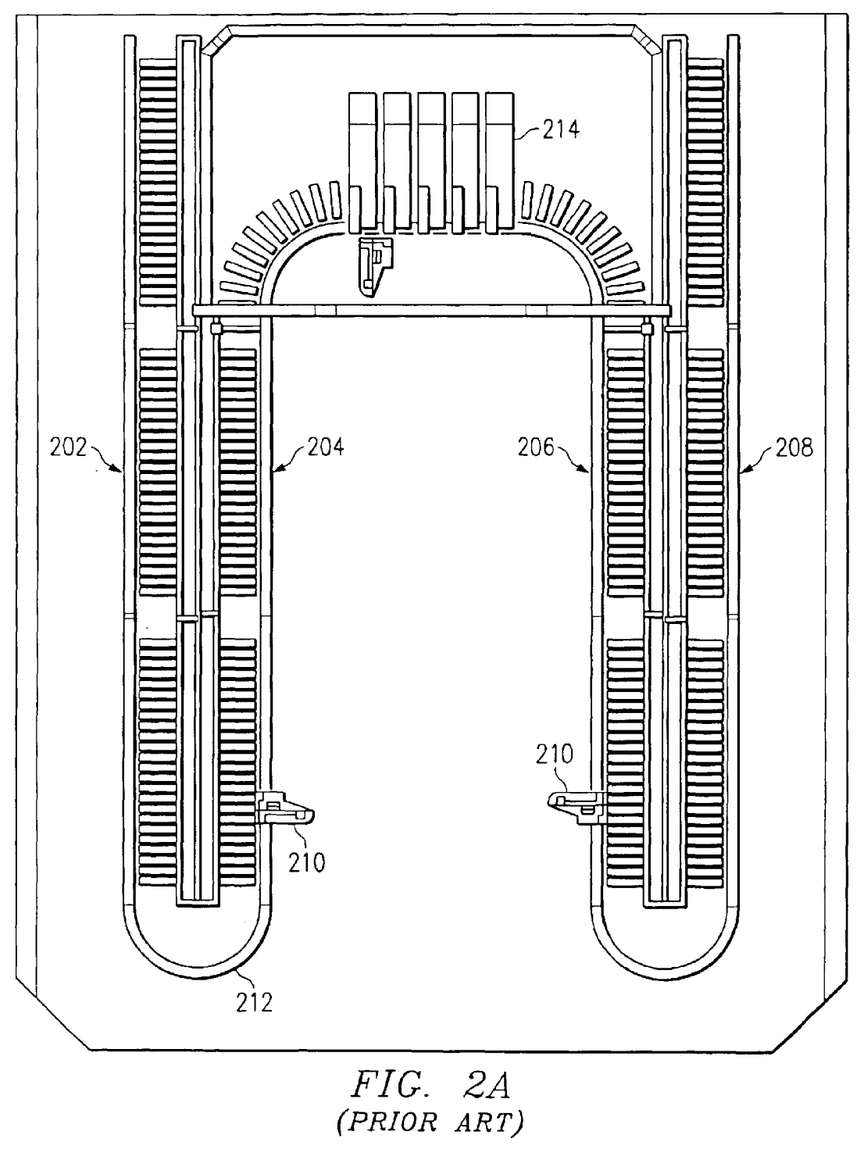
FIG. 2A a previous design of a large data storage library of a different, ring shaped configuration.

FIG. 2A shows a large storage library of a previous design. In this example, storage arrays 202, 204, 206, 208 (which hold individual storage elements) are positioned similar to the example of FIG. 1 except that additional arrays 202, 208 are positioned on the "backside" of each array 204 and 206, forming four separate arrays or walls of storage slots. This figure shows two robotic access devices 210 which translate along track 212 to access individual storage elements. Also shown are drives 214 for reading the data storage elements. Robotic access devices 210 in this example remove the storage elements from a slot and translate the element to drives 214, then back again as necessary. As the figure shows, there is a large amount of unused space in this design between the two sets of storage arrays. The positions of the arrays, i.e., two sets back to back on either side of the library, requires room on both sides of the arrays for the robot to access the storage elements therein.

Figure 2B:
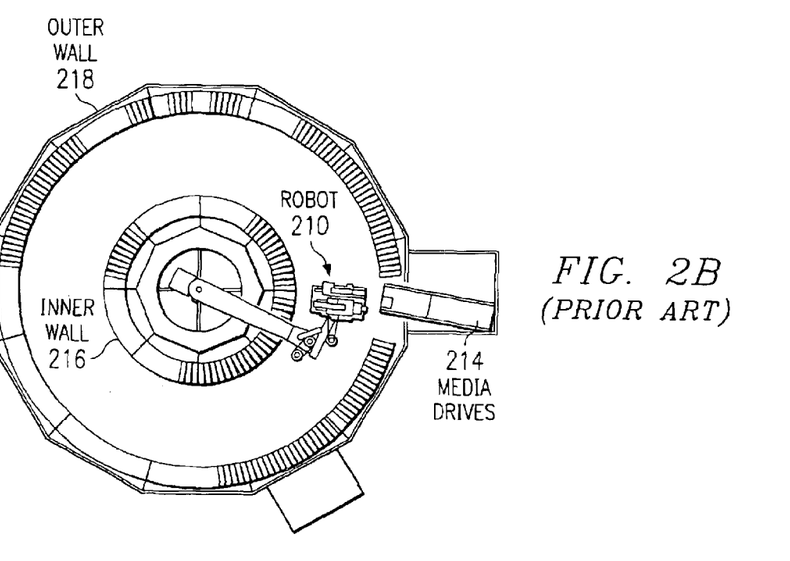
FIG. 2B shows a ring shaped design for a previous storage system.

FIG. 2B shows another kind of known storage library. In this example, the library comprises inner 216 and outer 218 rings of storage slots. The individual storage elements in each slot are accessed by arm 210 that rotates on an axis concentric with the centers of the rings. Media drives 214 are positioned to receive retrieved storage elements from the arm. In this configuration, the robot arm must be able to reach through the inner ring to the outer ring, requiring the use of valuable space that could otherwise be used for storage elements.

Figure 2C:
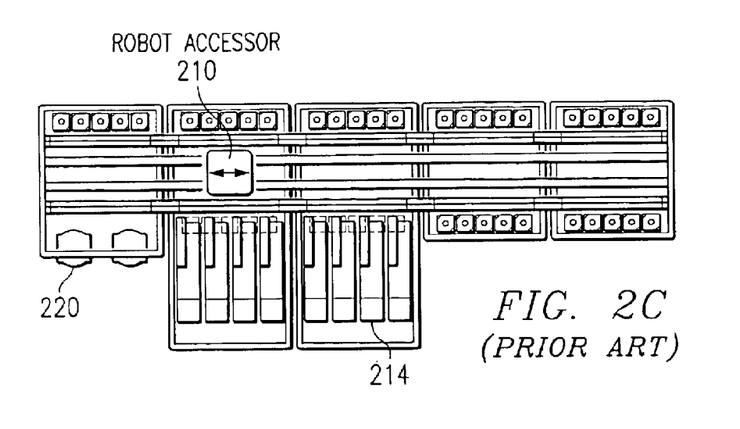
FIG. 2C shows a linear storage system of a previous design.

FIG. 2C shows a top view of yet another storage system of previous design. This example depicts a simple, straight forward linear array of storage slots which are accessed by a robotic picker of some kind 210. Robot 210 moves the individual storage elements from their storage slot to media drives 214 and back again. Access ports 220, which can serve as staging areas for shuffling storage elements, are also shown.

In both small and large libraries, limited space provides a constant impetus to increase storage density, and it is to this problem that the present innovation is directed.

SUMMARY OF THE INVENTION

The present innovative storage library adds storage density to a data storage library scheme, reducing the footprint or floor area occupied by the library apparatus. In one example embodiment, increased storage density is accomplished by positioning a storage array on either side of the library, facing each other and being substantially parallel. Drives are positioned at one open end of the two parallel arrays, so that the two arrays plus the drives form a U-shaped configuration. Between two storage arrays are positioned two more storage arrays placed back to back such that the four arrays are substantially parallel. A robotic access device translates along a U-shaped track. By translating along the track and/or rotating 180 degrees, the access device can access any individual storage element in any of the four arrays, as well as the drives.

The innovative storage library disclosed herein provides superior storage density compared to prior art libraries, reducing the footprint of a library and hence the space required for data storage.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The innovative storage library scheme disclosed herein is discussed with reference to the Figures.

Figure 3:
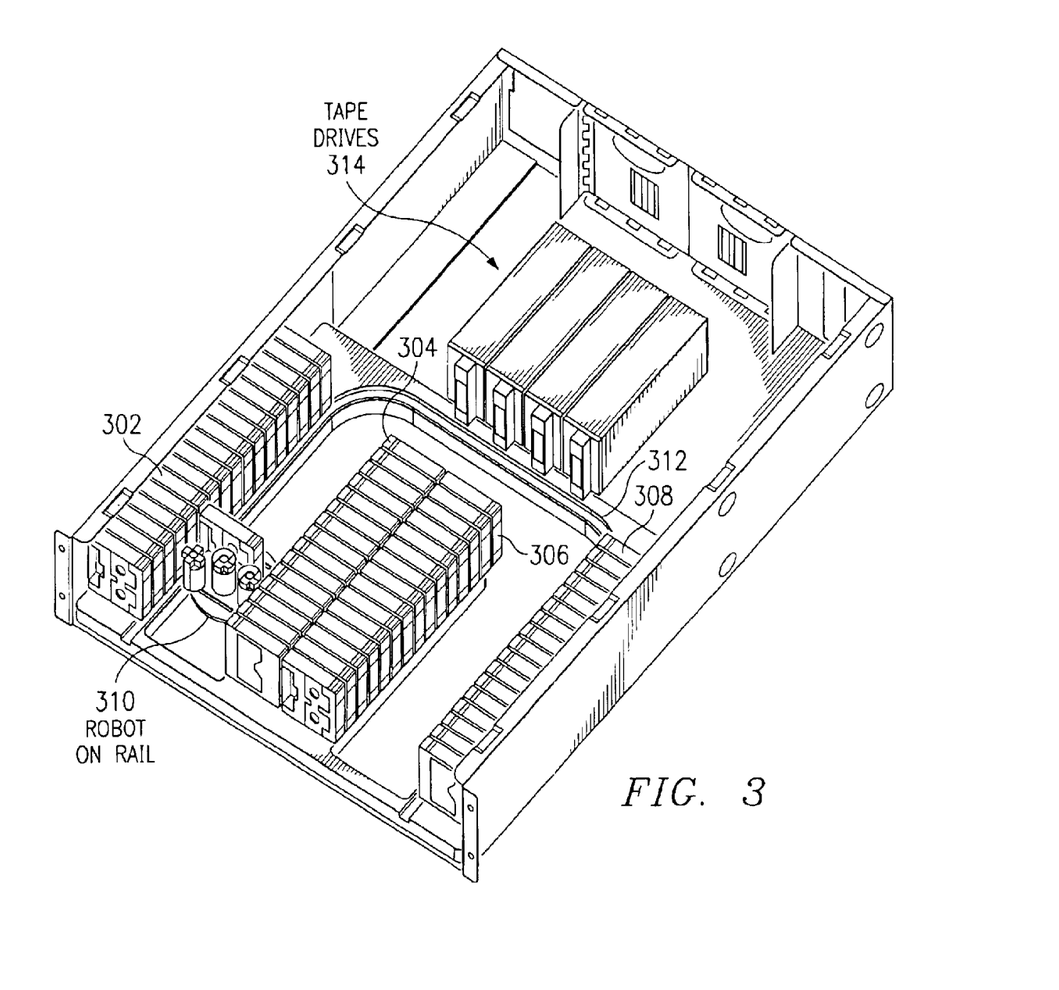
FIG. 3 shows a cutaway view of a small sized data storage library implementing a preferred embodiment of the present invention.

FIG. 3 shows a cutaway view of a small, approximately 19" wide desk mountable data storage library implementing a preferred embodiment of the present invention. This embodiment comprises a library having four linear arrays 302, 304, 306, 308 of storage slots for individual data storage elements. The storage arrays are accessed by robotic picker 310 that translates along track 312. Track 312 allows access device 310 to traverse from the storage arrays to drives 314 where the data of the storage elements are accessed.

Storage arrays 304, 306 are positioned between storage arrays 302 and 308, and all are substantially parallel, depending on the exact implementation. (For example, these arrays could be slightly non-parallel if required, or even slightly curved, though this is less preferred.) The position of the access device and storage arrays 304 and 306 allows the access device, when it is in a particular position as shown, for example, to access a storage slot on either array 302 or on array 304. In this case, the access device can change the array it accesses by performing a rotation of 180 degrees, changing its facing (for example) from array 302 to array 304. (For example, if the access device is oriented to access storage elements from outer storage array 302 before accessing an element from inner storage array 304, then a rotation is necessary to reorient the access device to access elements from inner storage array 304.) By translating along that section of track 312 and rotating as needed, any storage slot on either of these arrays can be accessed. Track 312 continues past drives 314 to the area between the other two storage arrays 306 and 308. Again, when the access device is in a particular position, a slot from either array can be accessed by rotating the access device by 180 degrees. In this manner the single access device can access any slot in either of four arrays, arrays 302, 304, 306, and 308.

If a data storage element is taken from outer arrays 302 or 308, then the access device need only translate to drives 314 and insert the storage element. If a storage element is taken from inner arrays 304, and 306, then the access device must perform a translation (to get to the drives) and a rotation (so that it faces the drives) in order to access the data on the storage element. The rotation can be performed before, during, or after the translation to the drives in this case, depending on the specific implementation.

Though the above example embodiment was described with reference to a translating and/or rotating access device, those of ordinary skill in the art will recognize that other methods of access device operation are possible with the innovative storage library. For example, a bi-directional pass-through gripper that can access storage elements on two sides of the access device without rotating the access device can be implemented. Such an access device can access storage elements stored in arrays on either side of a path for the access device.

Figure 4A:
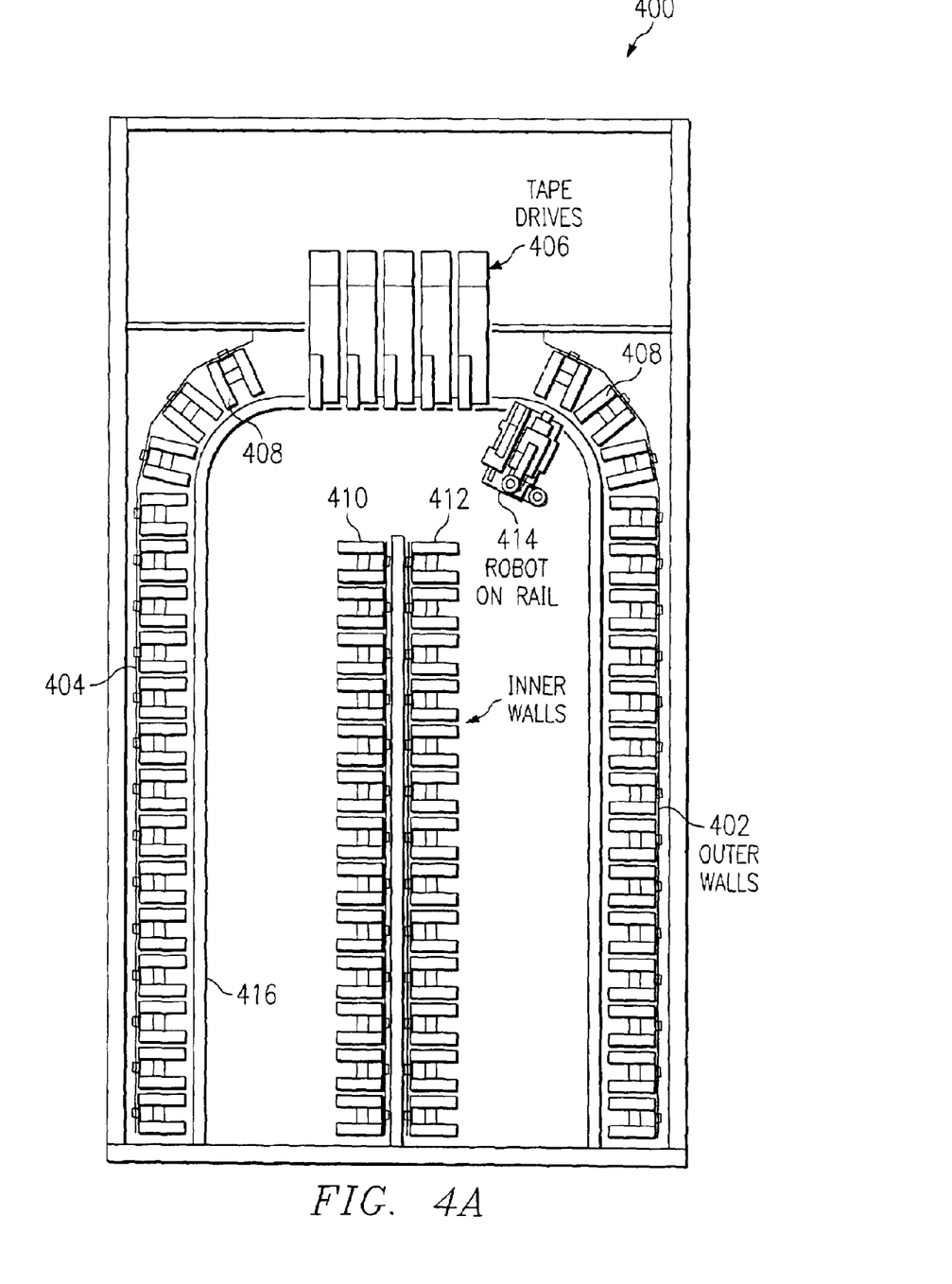
FIG. 4A shows a second cutaway view of a large sized innovative storage library, in accordance with a preferred embodiment of the present innovations.

FIG. 4A shows a top view of a second, larger embodiment of the innovative storage library, this embodiment showing added storage slots that take advantage of unused space. This example embodiment shows a library about 60 inches across, also referred to by Storage Technologies, Inc. as an "Enterprise" class library.

This innovative library 400 shows a U-shaped configuration, the two sides of the U comprising two linear arrays 402 and 404, and the bottom of the U comprising drives 406. Note the addition of several individual storage slots 408 at the curves of the U, using this space to increase storage density.

The library also has two arrays of storage slots 410, 412 positioned between two outer arrays, arrays 402, and 404, and parallel thereto. These two arrays 410, and 412 face back-to-back. As in the embodiment of FIG. 3, inner arrays 410, 412 can be accessed by the same access device 414 that accesses the outer arrays 402, 404. The access device can translate along a path on the U-shaped walls, preferably track 416, to reach individual storage slots and to move accessed data storage elements to and from drives 406. (Note that a robot need not necessarily use a "track" per se for translation, and can use other means such as a magnetic strip, optical guides, or even end-over-end mechanical movement.) When access device 414 is in a first section of track 416, it can access either outer array 402 or, by rotating 180 degrees, it can access inner array 412. Likewise, when the access device is positioned on another section of track 416, it can access either outer array 404, or it can access inner array 410 by performing a 180 degree rotation.

If the access device accesses a data storage element in one of inner arrays 410, 412, both a rotation and a translation may be performed to insert the storage element into drive 406. (For example, if access device 414 is oriented to access storage elements from outer storage array 404 before accessing an element from inner storage array 410, then a rotation is necessary to reorient the access device to access elements from inner array 410.) If access device 414 accesses a storage element from one of outer arrays 402, 404 then the access device need only perform a translation to insert the storage element into a drive 406.

Figure 4B:
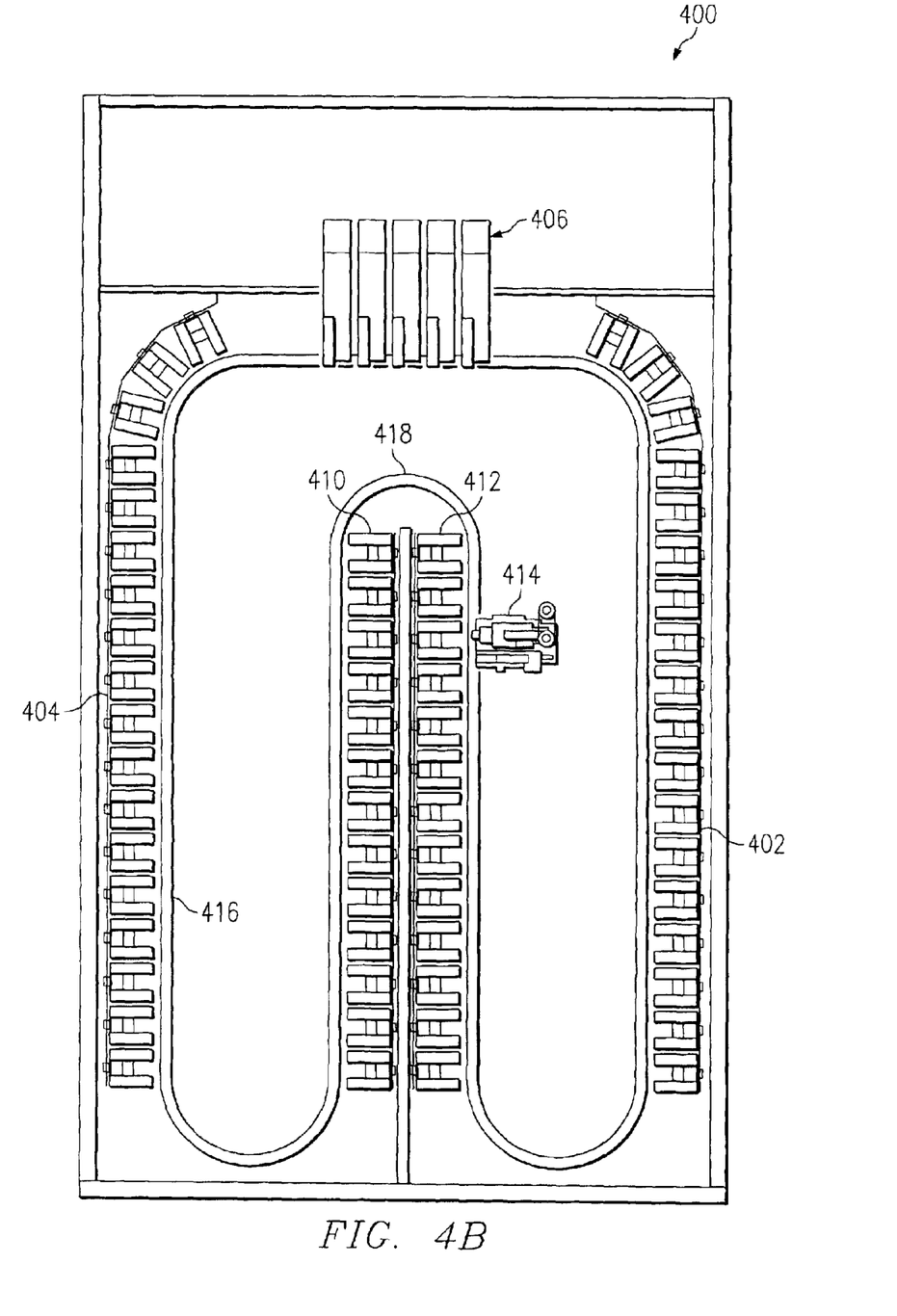
FIG. 4B shows a variation on track design for the innovative storage system, in accordance with a preferred embodiment of the present innovations.

FIG. 4B shows another embodiment, in which the path for the access device follows a route that takes it past all the storage slots, including the inner two storage arrays shown. In a preferred embodiment, the path is a closed, continuous circuit. Path 416 turns passes along outer array 402 before it turns 180 degrees at the bottom of the figure to pass along inner array 412. It then turns another 180 degrees around top end 418 to pass along inner array 410. Then the path returns to the bottom of the figure where it once again turns 180 degrees to pass along outer array 404. This embodiment alleviates the need to have a robotic access device capable of swiveling. Since the access device can pass next to any array, the device need not have the swiveling capability for accessing the inner two arrays as described in FIG. 4A.

Figure 5:
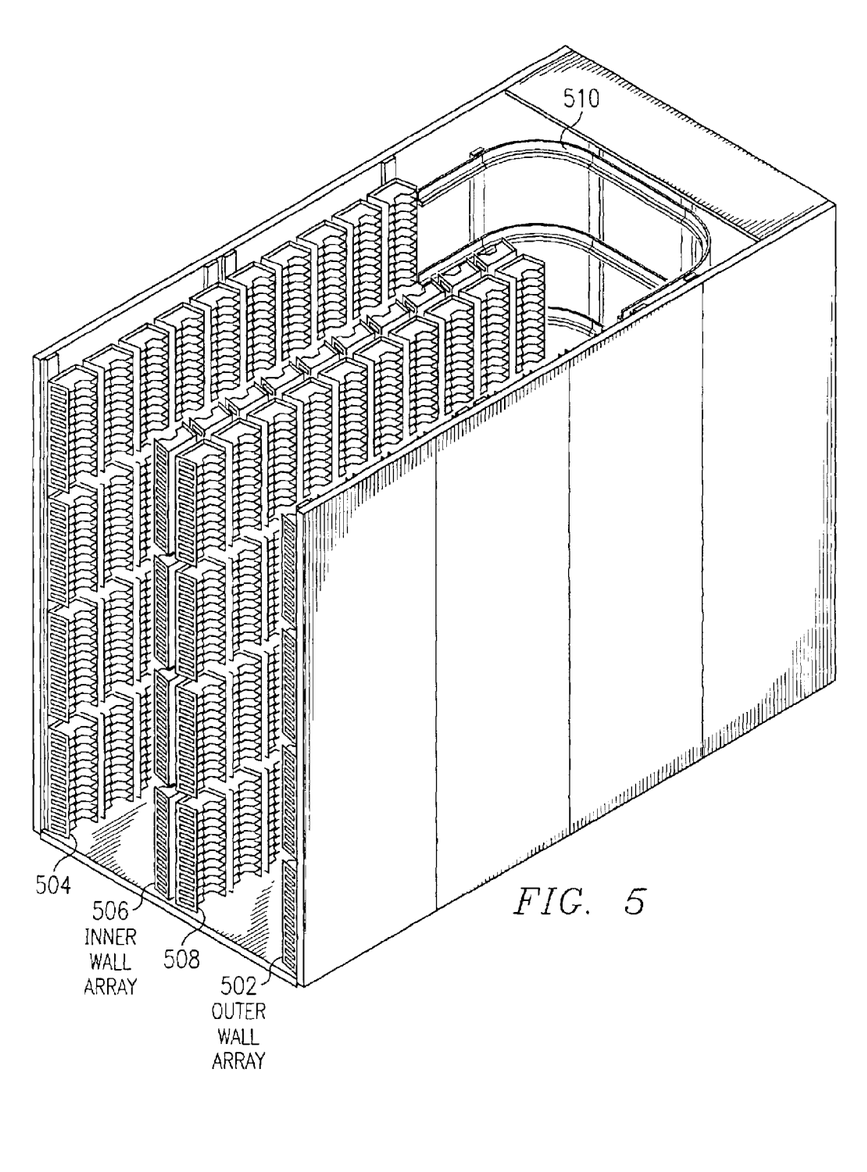
FIG. 5 depicts an innovative storage library having multiple levels or two-dimensional arrays of storage slots, in accordance with a preferred embodiment of the present innovations.

FIG. 5 depicts an isometric view of the innovative storage library from FIG. 4A, having multiple levels or two-dimensional arrays of storage slots. The outer walls of the library have storage arrays 502, 504 positioned thereon, facing inward so as to be accessed by the access device (not shown). There are also two inner two-dimensional storage arrays 506, 508 each facing an outer storage array, 504, 502, respectively. Access to the inner and outer storage arrays is via an access device such as a robotic picker that moves along track 510. The access device is capable of performing a rotation such that if it is positioned to access outer array 502, for example, then it can rotate and be positioned to access inner array 508. Likewise, if the access device is positioned to access inner array 506, then it can perform a rotation to be in position to access outer array 504. In a preferred embodiment, each level of the extended storage library of FIG. 5 is equipped with an access device. However, other implementations are possible, such as an access device that can change levels when required, though this is a less preferred embodiment.

Figure 6:
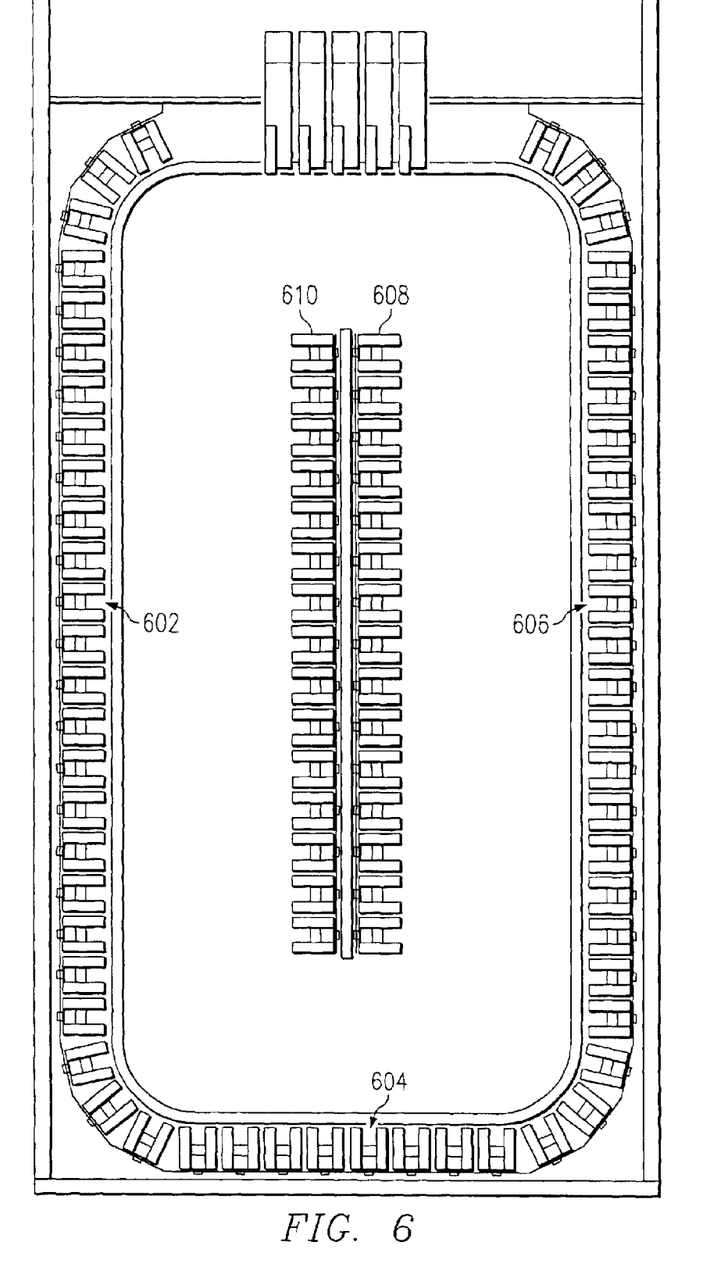
FIG. 6 shows another configuration of a storage library having four sides, in accordance with a preferred embodiment of the present innovations.

FIG. 6 shows yet another embodiment of the present innovations. In this variation, the innovative storage library has four outer walls, three of which 602, 604, 606 that serve as storage for individual data storage elements. There are also two inner, back-to-back walls 608, 610. The library includes a robotic access device (not shown) that is capable of accessing both the inner two arrays and the outer arrays as previously described. The access device can be similar to that described in FIG. 4A, which follows a path around the outer perimeter only and accesses the inner arrays by rotating 180 degrees. Or, the access device can be similar to that described in FIG. 4B, in which the path bends so as to pass along both the inner and outer arrays, eliminating the need for a rotation-capable access device.

Figure 7:
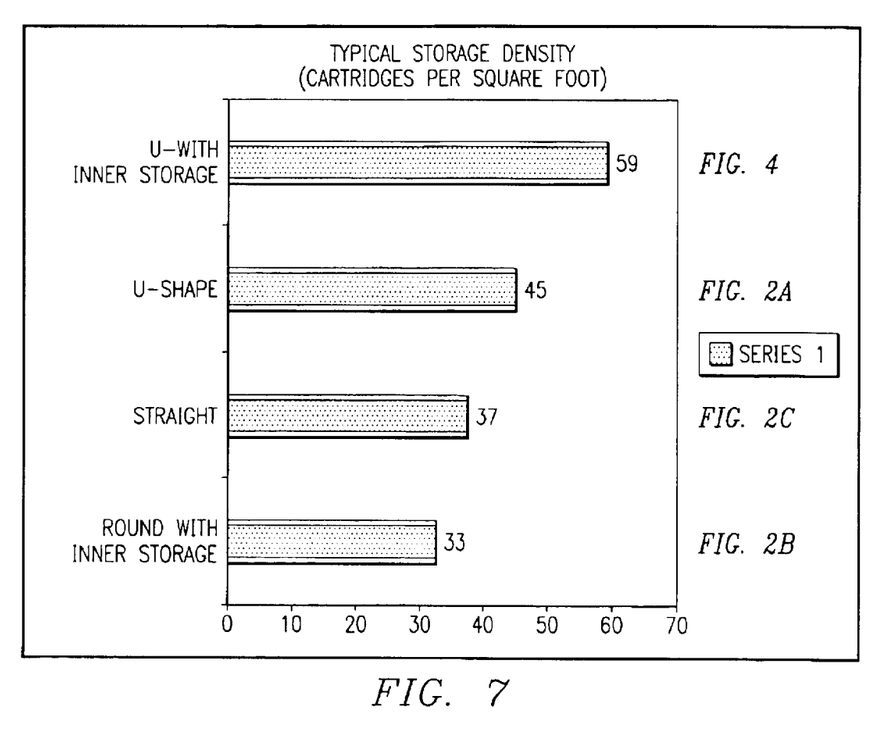
FIG. 7 shows a chart plotting carts per square foot of various storage library schemes.

FIG. 7 shows a chart plotting cartridges per square foot of various storage library schemes. In estimating storage density, it is reasonable to include access aisle space which is necessary for an operator to perform maintenance on the library and its parts.

The bottommost bar shows the storage density (in data storage elements per square foot) of a concentric "silo" style storage library, where data storage elements are kept in a circular drum, as shown in FIG. 2B. The chart shows that silo style libraries contain about 33 data storage elements per square foot. The next data bar above is for straight or linear storage arrays, as shown in FIG. 2C. This chart shows an estimate of 37 cartridges per square foot. The next bar shows the density for a U-shaped library as shown in FIG. 2A. The chart estimates this type of library to store about 45 storage elements per square foot.

The top data bar represents the storage density for the innovative library having an inner storage array. As can be shown, the inner storage array increases the storage density by a significant amount, estimating an average storage density of 59 data storage elements per square foot.

Though this invention has been described with reference to the example embodiments described herein, it should be noted that the innovative concepts can be applied beyond the specific examples of this specification. Examples of data storage elements include, but are not limited to, tape cartridges, disks, floppy disks, hard disks, compact disks, DVDs, and any type of data storage technology hereinafter developed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data storage library, comprising:

first and second arrays of storage cells, the storage cells in the first and second arrays being operable to receive data storage elements, the first and second arrays describing an interior space between the first and second arrays; and a third array of storage cells, the storage cells in the third array being operable to receive data storage elements, the third array being substantially located within the interior space and comprises two storage arrays arranged substantially back-to-back;

wherein a robotic picker is translatable along a path, the path located within the interior space; and wherein the path has sections adjacent to each storage array of the library such that the robotic picker can access any storage array by translating to it along the path.

2. The library of claim 1, wherein when the robotic picker is positioned to access a storage element of the first array, it can rotate so as to access a storage element of the third array.

3. The library of claim 1, wherein the data storage elements are selected from the group consisting of magnetic tape cartridges, floppy disks, hard disks, and compact disks.

4. A data storage library, comprising:

first and second arrays of storage cells, the storage cells in the first and second arrays being operable to receive data storage elements, the first and second arrays describing an interior space between the first and second arrays; and a third array of storage cells, the storage cells in the third array being operable to receive data storage element the third array being substantially located within the interior space and comprises two storage arrays arranged substantially back-to-back;

wherein a robotic picker is translatable along a path, the path located within the interior space;

wherein the path has sections adjacent to each storage array of the library such that the robotic picker can access any storage array translating to it along the path; and wherein the robotic picker has a bi-directional pass-through gripper that can access storage elements on two sides of an access device without rotating the access device.

5. A data storage library, comprising:

a storage area having a plurality of storage arrays, the arrays capable of storing individual data storage elements;

an access device capable of accessing data storage elements from the plurality of storage arrays, the access device being translatable along a path;

first and second storage arrays within the plurality of storage arrays positioned on opposite sides of the storage area facing each other; and a third storage array within the plurality of storage arrays positioned substantially parallel to the first and second storage arrays and positioned between the first and second storage arrays, wherein by translation along the path the access device can access data storage elements in the first and second storage arrays; and wherein when the access device is positioned to access a storage element in the first storage array, the access device can perform a rotation to be positioned to access storage elements in the third storage array.

6. A data storage library, comprising:

a storage area having a plurality of storage arrays, the arrays capable of storing individual data storage elements;

an access device capable of accessing data storage elements from the plurality of storage arrays, the access device being translatable along a path;

wherein the path passes continuously past each of the storage arrays of the plurality much that the access device can access any storage array of the plurality by translating along the path; and first and second storage arrays within the plurality of storage arrays positioned on opposite sides of the storage area facing each other; and a third storage array within the plurality of storage arrays positioned substantially parallel to the first and second storage arrays and positioned between the first and second storage arrays.

7. The library of claim 6, further comprising a fourth storage array of the plurality positioned substantially parallel to the second storage array and positioned between the second and the third storage arrays, such that when the access device is positioned to access a storage element in the second storage array, the access device can perform a rotation to be positioned to access storage elements in the fourth storage array.

8. The library of claim 6, further comprising a fourth storage array positioned substantially perpendicular to the first and second storage arrays such that the first, second, and fourth storage arrays form a U-shape.

9. The library of claim 6, wherein the path is a track upon which the access device moves.

10. The library of claim 6, wherein the access device has a bi-directional pass-through gripper that can access storage elements on two sides of the access device without rotating the access device.

11. The library of claim 6, wherein the data storage elements are selected from the group consisting of magnetic tape cartridges, floppy disks, hard disks, and compact disks.

12. A data storage library, comprising:

first, second, third, and fourth storage strays for holding data storage elements, all four storage arrays being substantially parallel to one another;

an access device capable of accessing data storage elements from the four storage arrays;

wherein when the access device is positioned to access storage elements from the first storage array, the access device can be rotated substantially 180 degrees to access storage elements from the second storage array; and wherein when the access device is positioned to access storage elements from the third storage array, the access device can be rotated substantially 180 degrees to access storage elements from the fourth storage array.

13. The library of claim 12, wherein the first and fourth storage arrays each face inward forming a space between them, and the second and third storage arrays are positioned substantially back-to-back within the space facing outward.

14. The library of claim 12, further comprising a fifth storage array substantially perpendicular to the first and fourth storage arrays and positioned relative to the first and fourth storage arrays such that the first, fourth, and fifth storage arrays form a U-shape.

15. The library of claim 14, further comprising a sixth storage array substantially parallel to the fifth storage array such that the first, fourth, fifth, and sixth storage arrays comprise a four-sided shape.

16. The library of claim 12, wherein the access device translates along a single path which passes adjacent to all storage arrays in the library.

17. The Library of claim 12, wherein the data storage elements are selected from the group consisting of magnetic tape cartridges, floppy disks, hard disks, and compact disks.

* * * * *